United States Patent
Sippel et al.

(10) Patent No.: US 11,073,045 B2
(45) Date of Patent: Jul. 27, 2021

(54) TURBINE SHROUD ASSEMBLY WITH CASE CAPTURED SEAL SEGMENT CARRIER

(71) Applicants: Rolls-Royce Corporation, Indianapolis, IN (US); Rolls-Royce North American Technologies Inc., Indianapolis, IN (US)

(72) Inventors: Aaron D. Sippel, Zionsville, IN (US); Ted J. Freeman, Danville, IN (US)

(73) Assignees: Rolls-Royce Corporation, Indianapolis, IN (US); Rolls-Royce North American Technologies Inc., Indianapolis, IN (US)

( * ) Notice: Subject to any disclaimer, the term of this patent is extended or adjusted under 35 U.S.C. 154(b) by 40 days.

(21) Appl. No.: 16/719,372

(22) Filed: Dec. 18, 2019

(65) Prior Publication Data
US 2021/0189909 A1    Jun. 24, 2021

(51) Int. Cl.
*F01D 25/24* (2006.01)
*F01D 11/08* (2006.01)
*F01D 9/04* (2006.01)
*F01D 25/12* (2006.01)

(52) U.S. Cl.
CPC ............ *F01D 25/246* (2013.01); *F01D 11/08* (2013.01); *F01D 9/04* (2013.01); *F01D 25/12* (2013.01); *F05D 2220/323* (2013.01); *F05D 2230/60* (2013.01); *F05D 2240/11* (2013.01); *F05D 2240/55* (2013.01); *F05D 2260/20* (2013.01); *F05D 2260/30* (2013.01); *F05D 2300/6033* (2013.01)

(58) Field of Classification Search
CPC . F01D 9/04; F01D 11/08; F01D 25/12; F01D 25/246; F05D 2220/323; F05D 2230/60; F05D 2240/11; F05D 2240/55; F05D 2260/20; F05D 2260/30; F05D 2300/6033
See application file for complete search history.

(56) References Cited

U.S. PATENT DOCUMENTS

| | | | |
|---|---|---|---|
| 5,593,276 A | 1/1997 | Proctor et al. | |
| 6,821,085 B2 | 11/2004 | Darkins, Jr. et al. | |
| 6,884,026 B2 | 4/2005 | Glynn et al. | |
| 7,416,362 B2 | 8/2008 | North | |
| 9,587,504 B2 | 3/2017 | McCaffrey et al. | |
| 9,587,517 B2 | 3/2017 | Vetters et al. | |
| 9,863,265 B2 | 1/2018 | Stapleton | |
| 9,874,104 B2 | 1/2018 | Shapiro | |
| 2006/0292001 A1 | 12/2006 | Keller et al. | |
| 2013/0004306 A1 | 1/2013 | Albers et al. | |
| 2015/0044044 A1* | 2/2015 | Sippel | F04D 29/522 415/220 |

(Continued)

*Primary Examiner* — Igor Kershteyn
(74) *Attorney, Agent, or Firm* — Barnes & Thornburg LLP

(57) ABSTRACT

A turbine module includes a turbine rotor assembly, a turbine case, and a turbine shroud assembly. The turbine rotor assembly is mounted to rotate about a central reference axis. The turbine case is spaced radially outward from the turbine rotor assembly circumferentially around the central reference axis. The turbine shroud assembly includes a plurality of turbine shroud segments mounted to the turbine case. Each turbine shroud segment includes a blade track segment that faces the turbine rotor assembly and a carrier mounted to the turbine case.

20 Claims, 3 Drawing Sheets

(56) References Cited

U.S. PATENT DOCUMENTS

| | | | |
|---|---|---|---|
| 2016/0177786 A1* | 6/2016 | Sippel | F01D 11/08 |
| | | | 416/189 |
| 2016/0290140 A1* | 10/2016 | Thomas | F01D 25/246 |
| 2016/0348528 A1* | 12/2016 | Vetters | F01D 25/246 |
| 2017/0101882 A1* | 4/2017 | Sippel | F01D 11/005 |
| 2017/0268366 A1 | 9/2017 | McCaffrey et al. | |
| 2018/0291769 A1 | 10/2018 | Vetters et al. | |
| 2018/0340440 A1 | 11/2018 | Freeman et al. | |

* cited by examiner

TURBINE SHROUD ASSEMBLY WITH CASE CAPTURED SEAL SEGMENT CARRIER

FIELD OF THE DISCLOSURE

The present disclosure relates generally to gas turbine engines, and more specifically to turbine shrouds and other assemblies included in gas turbine engines.

BACKGROUND

Gas turbine engines are used to power aircraft, watercraft, power generators, and the like. Gas turbine engines typically include a compressor, a combustor, and a turbine. The compressor compresses air drawn into the engine and delivers high pressure air to the combustor. In the combustor, fuel is mixed with the high pressure air and is ignited. Products of the combustion reaction in the combustor are directed into the turbine where work is extracted to drive the compressor and, sometimes, an output shaft. Left-over products of the combustion are exhausted out of the turbine and may provide thrust in some applications.

Compressors and turbines typically include alternating stages of static vane assemblies and rotating wheel assemblies. The rotating wheel assemblies include disks carrying blades around their outer edges. When the rotating wheel assemblies turn, tips of the blades move along blade tracks included in static shrouds that are arranged around the rotating wheel assemblies. Such static shrouds may be coupled to an engine case that surrounds the compressor, the combustor, and the turbine. In some examples, attachment of such components can present challenges.

SUMMARY

The present disclosure may comprise one or more of the following features and combinations thereof.

According to the present disclosure, a turbine module includes a turbine rotor assembly, a turbine case, and a turbine shroud assembly. The turbine rotor assembly is mounted to rotate about a central reference axis. The turbine case is spaced radially outward from the turbine rotor assembly circumferentially around the central reference axis. The turbine shroud assembly interfaces with the turbine rotor assembly to block gases from flowing around the turbine rotor assembly without interacting with the turbine rotor assembly.

In some embodiments, the turbine shroud assembly includes a plurality of turbine shroud segments mounted to the turbine case radially between the turbine rotor assembly and the turbine case. Each turbine shroud segment includes a blade track segment comprising ceramic matrix composite materials and interfaces with the turbine rotor assembly and a carrier mounted to the turbine case that supports the blade track segment in a predetermined location relative to the turbine rotor.

In some embodiments, the carrier includes a support flange coupled with the blade track segment to mount the blade track segment to the carrier and a support panel engaged with the turbine case. The support panel includes a central portion a forward portion, and an aft portion. The central portion has an outer surface in confronting-relation with the turbine case and an inner surface from which the support flange extends radially inward toward the central reference axis. The forward portion extends axially forward away from the central portion into engagement with the turbine case. The aft portion extends axially aft away from the central portion into engagement with the turbine case.

In some embodiments, the forward portion and the aft portion each have an outermost surface that is co-radial with the outer surface of the center portion. The carrier has an axial length defined between a forward edge of the forward portion and an aft edge of the aft portion. The outer surface of the center portion and the outermost surfaces of the forward portion and the aft portion are all co-radial with one another across the entire axial length of the carrier segment.

In some embodiments, the turbine case includes a forward case section and an aft case section. The forward case section has a forward attachment flange and a forward hanger engaged with the forward portion of the carrier.

In some embodiments, the aft case section has an aft attachment flange and an aft hanger engaged with the aft portion of the carrier segment. The forward attachment flange is engaged with the aft attachment flange to clamp the carrier between the forward hanger and the aft hanger.

In some embodiments, the outer surface of the central portion and the outermost surfaces of the forward portion and the aft portion are spaced apart from an inner surface of the turbine case to provide a gap between the turbine case and the carrier that extends from a forward end of the forward portion to an aft end of the aft portion.

In some embodiments, the forward hanger is formed to include a cooling-air passage so that high-pressure cooling fluid is conducted into the gap to bias the carrier radially inward relative to the central reference axis. The central portion of the carrier is formed to include a cooling-air passage so that the high pressure cooling fluid is conducted radially inward toward the blade track segment.

In some embodiments, the support flange of the carrier is a forward support flange and the carrier further includes an aft support flange spaced apart axially from the forward support flange and an intermediate support flange positioned axially between the forward support flange and the aft support flange. The forward portion extends axially forward from the central portion past the forward support flange and the aft portion extends axially aft from the central portion past the aft support flange.

These and other features of the present disclosure will become more apparent from the following description of the illustrative embodiments.

DETAILED DESCRIPTION OF THE DRAWINGS

Figure 1:
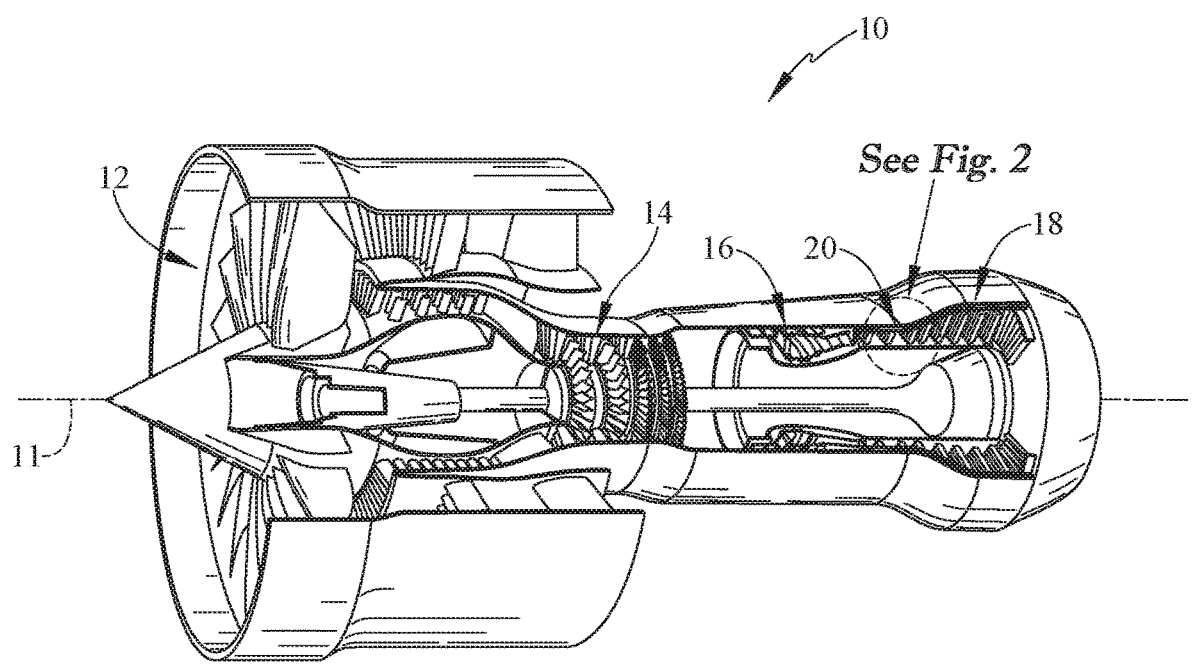
FIG. 1 is a cut-away perspective view of a gas turbine engine showing that the exemplary engine includes a fan driven by an engine core having a compressor, a combustor, and a turbine.

For the purposes of promoting an understanding of the principles of the disclosure, reference will now be made to a number of illustrative embodiments illustrated in the drawings and specific language will be used to describe the same.

An illustrative aerospace gas turbine engine 10 includes a fan 12, a compressor 14, a combustor 16, and a turbine 18 as shown in FIG. 1. The fan 12 is driven by the turbine 18 and provides thrust for propelling a vehicle. The compressor 14 compresses and delivers air to the combustor 16. The combustor 16 mixes fuel with the compressed air received from the compressor 14 and ignites the fuel. The hot, high-pressure products of the combustion reaction in the combustor 16 are directed into the turbine 18 to cause the turbine 18 to rotate about a central reference axis 11 and drive the compressor 14 and the fan 12.

Figure 2:
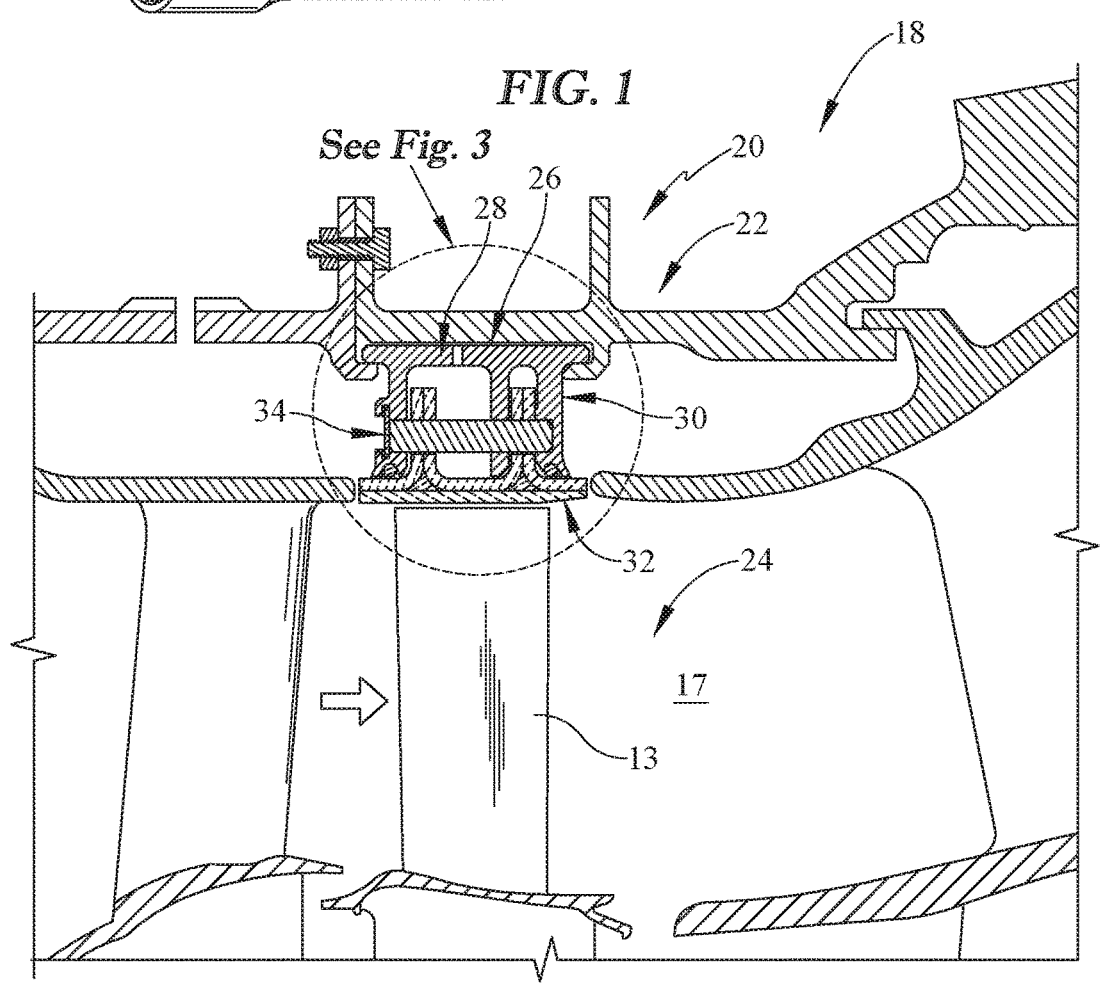
FIG. 2 is a partial cross-sectional view of the gas turbine engine of FIG. 1 showing the arrangement of a turbine module including a turbine shroud assembly radially outward from blades of a turbine rotor assembly to suggest that the turbine shroud assembly blocks gasses from passing over the blades without interacting with the blades.

The turbine 18 has at least one turbine module 20 that includes a turbine case 22, a turbine rotor assembly 24, and a turbine shroud assembly 26 as shown in FIGS. 1 and 2. The turbine case 22 extends circumferentially about the central reference axis 11. The turbine rotor assembly 24 is mounted for rotation about the central reference axis 11 relative to the turbine case 22. The turbine shroud assembly 26 is positioned to surround the turbine rotor assembly 24 radially between the turbine case 22 and the turbine rotor assembly 24.

The turbine rotor assembly 24 includes a plurality of blades 13 coupled to a rotor disk for rotation therewith. In operation, the hot, high pressure combustion products from the combustor 16 are directed toward the blades 13 of the turbine rotor assembly 24 along a flow path 17. The blades 13 are pushed by the combustion products to cause the turbine rotor assembly 24 to rotate; thereby, driving the rotating components of the compressor 14 and/or the fan 12.

Figure 3:
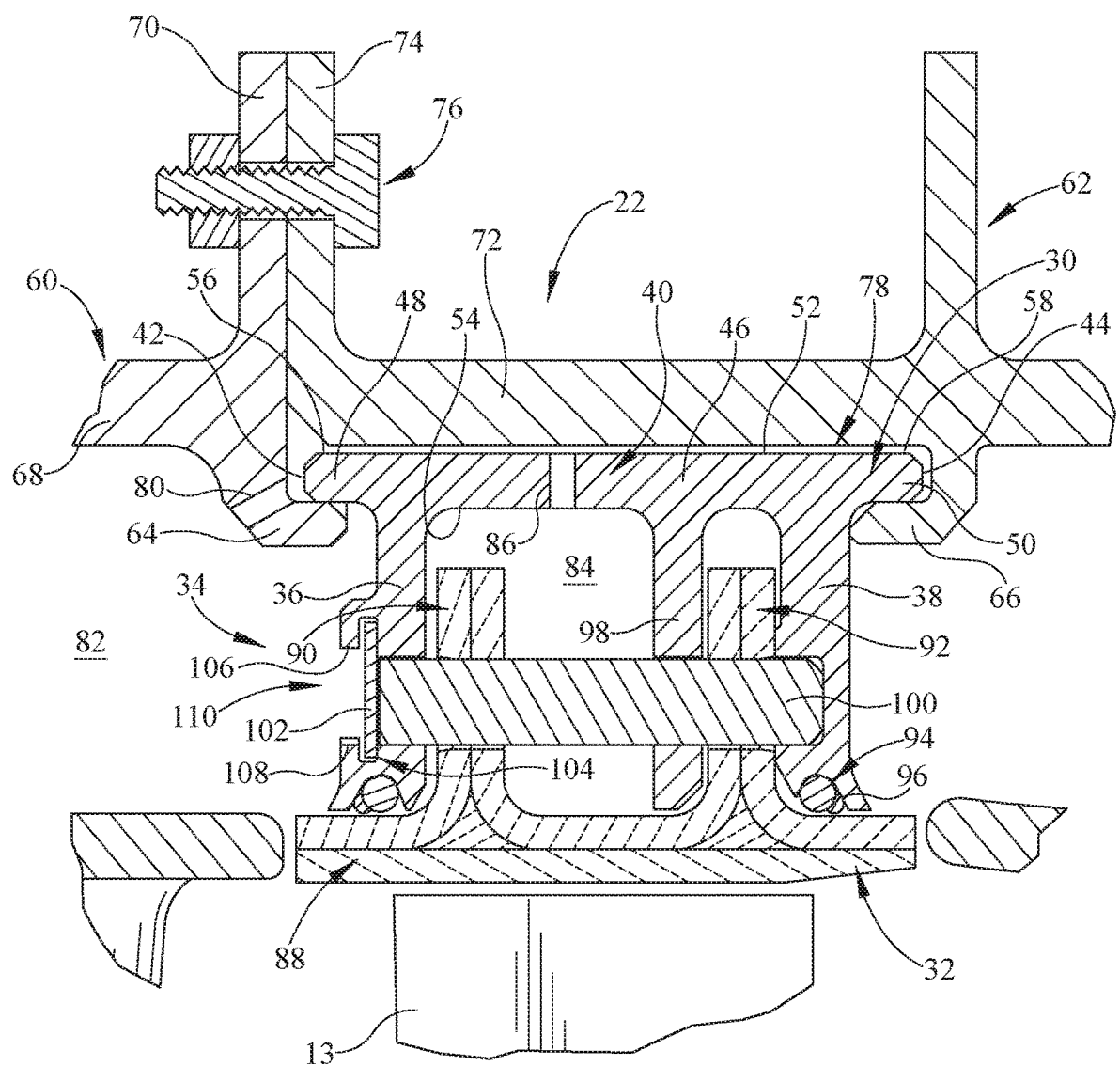
FIG. 3 is a detail view of a portion of FIG. 2 showing that the turbine shroud assembly includes a carrier with a support panel mounted to a turbine case of the gas turbine engine and showing that the support panel of the carrier has a forward ledge and an aft ledge that are co-radial with a central portion of the carrier to minimize a package space of the turbine shroud segment relative to the turbine case and the turbine rotor.
Figure 4:
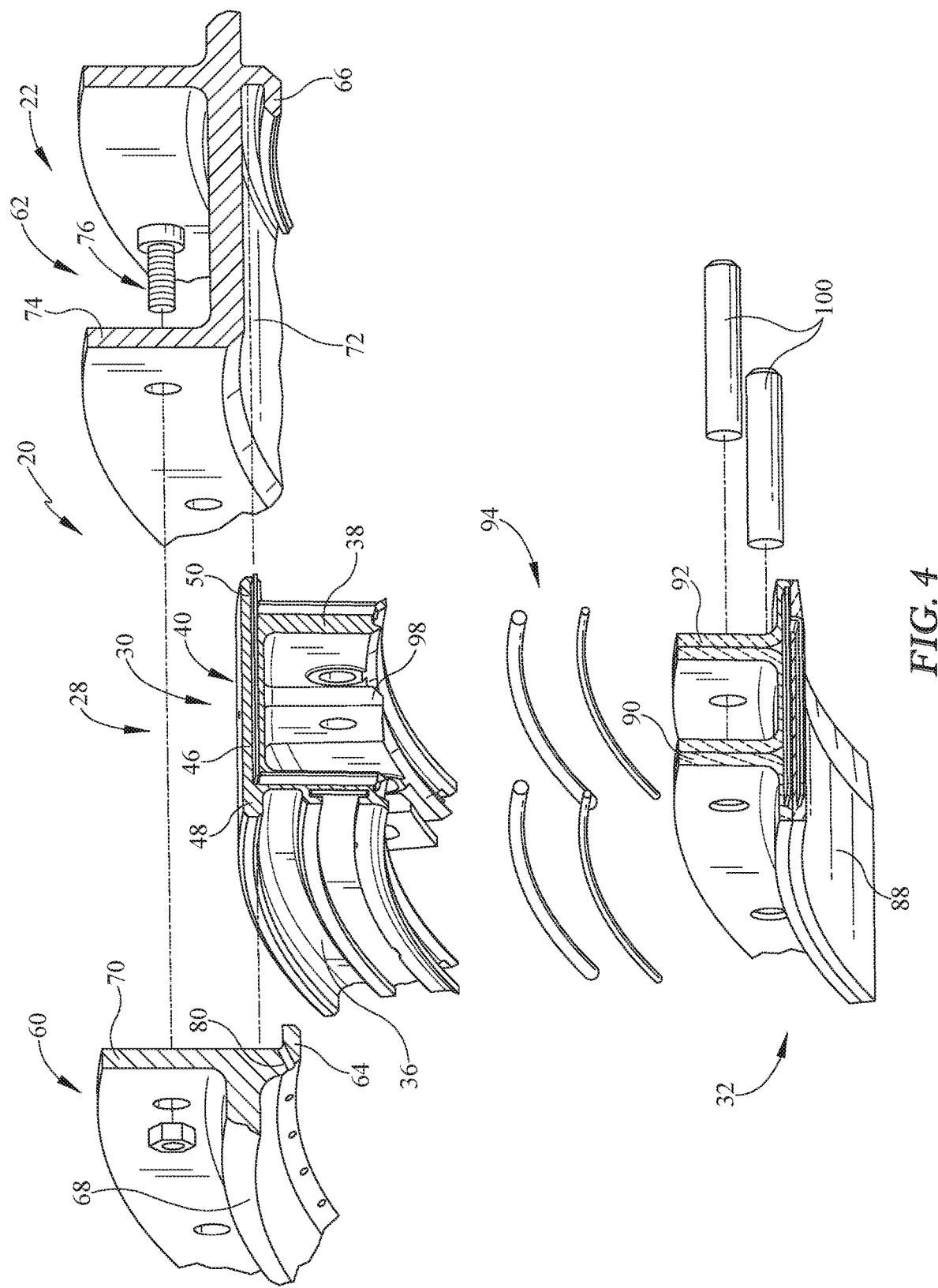
FIG. 4 is an exploded assembly view of the turbine shroud assembly and the turbine case from FIGS. 2 and 3 showing that the turbine case includes a forward section and an aft section that combine to clamp and retain the turbine shroud assembly relative to the turbine rotor assembly in the gas turbine engine.

The turbine shroud assembly 26 extends at least partway around the turbine rotor assembly 24 to block combustion products from passing over the blades 13 without pushing the blades 13 to rotate as suggested in FIG. 2. In the illustrative embodiment, the turbine shroud assembly 26 is made up of a number of turbine shroud segments 28, one of which is shown in FIGS. 2-4, that extend only part-way around the central axis 11 and cooperate to surround the turbine rotor assembly 24. The turbine shroud segments 28 are sealed against one another, such as by strip seal members, to provide a continuous turbine shroud assembly 26 around the central reference axis 11. In other embodiments, the turbine shroud assembly 26 is annular and non-segmented to extend fully around the central axis 11 and surround the turbine rotor assembly 24. In yet other embodiments, certain components of the turbine shroud assembly 26 are segmented while other components are annular and non-segmented.

Each turbine shroud segment 28 includes a carrier 30, a blade track segment 32, and a mount system 34 as shown in FIGS. 2-4. The carrier 30 is a metallic component and is coupled with the turbine case 22. The carrier 30 is configured to support the blade track segment 32 in a predetermined position adjacent to the blades 13 of the turbine rotor assembly 24. The blade track segment 32 (also called a seal segment) is positioned directly outward from the rotating blades 13 of the turbine rotor assembly 24. A small clearance gap is provided between a tip of the blades 13 and the blade track segment 32. There could be multiple blade track segments 32 per carrier 30 in other embodiments. The mount system 34 is configured to couple the blade track segment 32 to the carrier 30 such that the blade track segment 32 is properly located relative to the blades 13.

The carrier 30 is sized to minimize a package space of the turbine shroud segment 28 relative to the turbine case 22 and the turbine rotor assembly 24 as shown in FIGS. 2 and 3. The carrier 30 includes a forward support flange 36, an aft support flange 38, and a support panel 40 engaged with the turbine case 22. The forward support flange 36 and the aft support flange 38 are coupled with the blade track segment 32 to mount the blade track segment 32 to the carrier 30. The support panel 40 extends axially from a forward edge 42 to an aft edge 44 directly inward from the turbine case 22.

The support panel 40 extends in the axial and circumferential directions uninterrupted between the forward edge 42 and the aft edge 44 so that substantially all of the support panel 40 is arranged in close proximity to turbine case 22 as shown in FIG. 3. The support panel 40 includes a central portion 46, a forward portion 48, and an aft portion 50 as shown in FIG. 3. The central portion 46 has an outer surface 52 arranged in confronting-relation with the turbine case 22 and an inner surface 54 from which the support flanges 36, 38 extend radially inward toward the central reference axis 11. The forward portion 48 extends axially forward away from the central portion 46 into engagement with the turbine case 22. The aft portion 50 extends axially aft away from the central portion 46 into engagement with the turbine case 22.

The forward portion 48 and the aft portion 50 each have an outermost surface 56, 58 that is co-radial with the outer surface 52 of the central portion 46 as shown in FIG. 3. In the illustrative embodiment, the central portion 46, the forward portion 48, and aft portion 50 are co-radial with one another across an entire axial length of the carrier 30 between the forward edge 42 and the aft edge 44. The outermost surfaces 56, 58 of the forward portion 48 and the aft portion 50 extend only in the axial and circumferential directions relative to the central reference axis 11 such that no portions of the carrier 30 extend radially beyond the outermost surfaces 52, 56, 58. In some embodiments, outermost surfaces 52, 56, 58 of the central portion 46, the forward portion 48, and aft portion 50 are flush or constant with one another across the entire axial length of the carrier 30 between the forward edge 42 and the aft edge 44.

The forward portion 48 extends axially forward past the forward support flange 36 into engagement with the turbine case 22 while the aft portion 50 extends axially aft past the aft support flange 38 into engagement with the turbine case 22 shown in FIGS. 2 and 3. The turbine case 22 includes a forward section 60 and an aft section 62. The forward section 60 includes a forward hanger 64 while aft section 62 includes an aft hanger 66. The forward portion 48 engages the forward hanger 64 and the aft portion 50 engages the aft hanger 66 to clamp the carrier 30 between the forward section 60 and the aft section 62 and retain the carrier 30 to the turbine case 22.

The forward section 60 of the turbine case 22 includes a forward case body 68, the forward hanger 64, and a forward attachment flange 70 as shown in FIG. 3. The forward case body 68 provides an outer boundary for the gas turbine engine 10. The forward hanger 64 extends inwardly from the forward case body 68 relative to the central reference axis 11. The forward attachment flange 70 extends outwardly from the forward case body 68 relative to the central reference axis 11.

The aft section 62 of the turbine case 22 includes an aft case body 72, the aft hanger 66, and an aft attachment flange 74 as shown in FIG. 3. The aft case body 72 cooperates with the forward case body 68 to provide the outer boundary of the gas turbine engine 10. The aft hanger 66 extends inwardly from the aft case body 72 relative to the central reference axis 11. The aft attachment flange 74 extends outwardly from the aft case body 72 relative to the central reference axis 11. During assembly, the forward attachment flange 70 and the aft attachment flange 74 are coupled together using a fastener 76 to clamp the carrier 30 between the forward hanger 64 and the aft hanger 66 as shown in FIG. 3 and suggested in FIG. 4.

In the illustrative embodiment, the outer surface 52 of the central portion 46 and the outermost surfaces 56, 58 of the forward portion 48 and the aft portion 50 are spaced apart from an inner surface of the turbine case 22 to provide a gap 78 between the turbine case 22 and the carrier 30. The gap 78 is constant and extends uninterrupted from the forward edge 42 of the forward portion 48 to the aft edge 44 of the aft portion 50. The forward hanger 64 is formed to include a cooling-air passage 80 that extends from a plenum 82 into the gap 78. The cooling-air passage 80 conducts a cooling fluid from the plenum 82 into the gap 78. The cooling fluid provides a higher pressure in the gap 78 compared to a cavity 84 inward from the central portion 46 of the support panel 40 to bias the carrier 30 inward relative to the central reference axis 11.

In the illustrative embodiment, the central portion 46 of the carrier is formed to include a cooling-air passage 86 that extends between the gap 78 and the cavity 84. The high pressure cooling fluid is conducted radially inward toward the blade track segment 32 through the cooling-air passage 86. The cooling fluid is configured to cooling portions of the carrier 30, the blade track segment 32 and the mount system 34 so that the high operating temperatures of the gas turbine engine 10 do not damage those components.

In the illustrative embodiment, the blade track segment 32 is made from ceramic-matrix composite materials that are adapted to withstand high temperatures. In other embodiments metallic or another suitable material may be used. The blade track segment 32 includes a shroud segment 88, a forward mount post 90 and an aft mount post 92. The shroud segment 88 extends axially from forward support flange 36 to the aft support flange 38. The forward mount post 90 and the aft mount post 92 extend outward from the shroud segment 88 toward the support panel 40 of the carrier 30. The forward mount post 90 and the aft mount post 92 are axially between the forward support flange 36 and the aft support flange 38. The tandem seals 94 are arranged radially between the carrier 30 and the blade track segments 32 in channels 96 such that they block the flow of gasses between the carrier 30 and the blade track segment 32.

In the illustrative embodiment, the carrier 30 further includes an intermediate support flange 98 located axially between the forward support flange 36 and the aft support flange 38 as shown in FIGS. 3 and 4. The mount system 34 includes an attachment pin 100 that extends axially through the forward and intermediate support flanges 36, 98 and into the aft support flange 38. The attachment pin 100 also extends through the forward mount post 90 and the aft mount post 92 to couple the blade track segment 32 to the carrier 30.

The attachment pin 100 is retained to the carrier 30 and the blade track segment 32 by a retainer plate 102 that is fed circumferentially through a slot 104 once the attachment pin 100 is fully installed. The slot 104 is defined by tabs 106, 108 that are coupled to the forward support flange 36 as shown in FIG. 4. The tabs 106, 108 block the retainer plate 102 and the attachment pin 100 from being moved axially forward away from the forward support flange 36. A space 110 radially between the tabs 106, 108 is sized to allow the attachment pin 100 to be inserted therebetween and through apertures in the carrier 30 and the blade track segment 32 as shown in FIGS. 3 and 4.

In some embodiments, one challenge that exists is space claim in a gas turbine engine. Typically, radial space claim for a high-pressure seal segment (i.e. blade track segment 32) is a set of defined boundaries. The inner boundary or flow path definition may be set for aero and performance. The outer boundary (i.e. the casing inner diameter) may be set to minimize overall engine size and weight. Fitting the seal segment and carrier designs into this tight radial space may be challenging.

In some embodiments, the sizes of features in ceramic matrix composite (CMC) high-pressure seal segments (HPSS) are often larger than metallic counterparts. Wall thickness and bend radii on a CMC segment among other features can all contribute to a radially taller component. For these reasons a different interface between the carriers and cases may help create more radial space for the CMC HPSS.

In some embodiments, the carrier hooks (i.e. portions 48, 50) interface with the cases. In this configuration the carrier hooks or oriented away from each other. In some embodiments, the carrier is attached to a single case. In the illustrative embodiment, the carrier can be radially supported by 2 cases (i.e. segments 60, 62). In addition, the flanges of the cases may be used as tip clearance control towers for cooling the case and those towers are still aligned with the carrier hooks for optimal control of the segment tip clearance to the blade.

In some embodiments, the radial space claim for the segment can be improved by extending the carrier hooks axially (instead of radially) away from the rest of the carrier body. In some embodiments, this can add about 3-4 mm of additional radial space for the CMC HPSS.

While the disclosure has been illustrated and described in detail in the foregoing drawings and description, the same is to be considered as exemplary and not restrictive in character, it being understood that only illustrative embodiments thereof have been shown and described and that all changes and modifications that come within the spirit of the disclosure are desired to be protected.

What is claimed is:

1. A turbine module comprising a turbine rotor assembly mounted to rotate about a central reference axis a turbine case spaced radially outward from the turbine rotor assembly circumferentially around the central reference axis, and a turbine shroud assembly that interfaces with the turbine rotor assembly to block gases from flowing around the turbine rotor assembly without interacting with the turbine rotor, the turbine shroud assembly comprising a plurality of turbine shroud segments mounted to the turbine case radially between the turbine rotor assembly and the turbine case, each turbine shroud segment including a blade track segment comprising ceramic matrix composite materials and interfaces with the turbine rotor assembly and a carrier mounted to the turbine case that supports the blade track segment in a predetermined location relative to the turbine rotor, wherein the carrier includes a support flange coupled with the blade track segment to mount the blade track segment to the carrier and a support panel engaged with the turbine case, the support panel including a central portion having an outer surface in confronting-relation with the turbine case and an inner surface from which the support flange extends radially inward toward the central reference axis, a forward portion that extends axially forward away from the central portion into engagement with the turbine case, and an aft portion that extends axially aft away from the central portion into engagement with the turbine case, and wherein the forward portion and the aft portion each have an outermost surface that is co-radial with the outer surface of the center portion.

2. The turbine module of claim 1, wherein the carrier has an axial length defined between a forward edge of the forward portion and an aft edge of the aft portion, and wherein the outer surface of the center portion and the outermost surfaces of the forward portion and the aft portion are all co-radial with one another across the entire axial length of the carrier segment.

3. The turbine module of claim 1, wherein the turbine case includes a forward section and an aft section, the forward case section having a forward attachment flange and a forward hanger engaged with the forward portion of the carrier and the aft section having an aft attachment flange and an aft hanger engaged with the aft portion of the carrier segment.

4. The turbine module of claim 3, wherein the forward attachment flange is engaged with the aft attachment flange to clamp the carrier between the forward hanger and the aft hanger.

5. The turbine module of claim 3, wherein the outer surface of the central portion and the outermost surfaces of the forward portion and the aft portion are spaced apart from an inner surface of the turbine case to provide a gap between the turbine case and the carrier that extends from a forward end of the forward portion to an aft end of the aft portion.

6. The turbine module of claim 5, wherein the forward hanger is formed to include a cooling-air passage so that high-pressure cooling fluid is conducted into the gap to bias the carrier radially inward relative to the central reference axis.

7. The turbine module of claim 6, wherein the central portion of the carrier is formed to include a cooling-air passage so that the high pressure cooling fluid is conducted radially inward toward the blade track segment.

8. The turbine module of claim 1, wherein the support flange of the carrier is a forward support flange and the carrier further includes an aft support flange spaced apart axially from the forward support flange and an intermediate support flange positioned axially between the forward support flange and the aft support flange.

9. The turbine module of claim 8, wherein the forward portion extends axially forward from the central portion past the forward support flange and the aft portion extends axially aft from the central portion past the aft support flange.

10. The turbine module of claim 9, wherein the turbine case includes a forward case section and an aft case section, the forward case section having a forward attachment flange and a forward hanger engaged with the forward portion of the carrier and the aft section having an aft attachment flange and an aft hanger engaged with the aft portion of the carrier segment.

11. A turbine module comprising
a turbine rotor assembly mounted to rotate about a central reference axis
a turbine case spaced radially outward from the turbine rotor assembly circumferentially around the central reference axis, and
a turbine shroud assembly comprising a plurality of turbine shroud segments mounted to the turbine case, each turbine shroud segment including a blade track segment that faces the turbine rotor assembly and a carrier mounted to the turbine case,
wherein the carrier includes a support flange coupled with the blade track segment and a support panel engaged with the turbine case, the support panel including a central portion having an outer surface in confronting-relation with the turbine case, a forward portion that extends axially forward away from the central portion, and an aft portion that extends axially aft away from the central portion, and wherein the forward portion and the aft portion each have an outermost surface that is flush with the outer surface of the center portion.

12. The turbine module of claim 11, wherein the carrier has an axial length defined between a forward edge of the forward portion and an aft edge of the aft portion, and wherein the outer surface of the center portion and the outermost surfaces of the forward portion and the aft portion are all co-radial with one another across the entire axial length of the carrier segment.

13. The turbine module of claim 12, wherein the turbine case includes a forward section and an aft section, the forward section having a forward attachment flange and a forward hanger engaged with the forward portion of the carrier and the aft section having an aft attachment flange and an aft hanger engaged with the aft portion of the carrier segment.

14. The turbine module of claim 13, wherein the forward attachment flange is coupled with the aft attachment flange to clamp the carrier between the forward hanger and the aft hanger.

15. The turbine module of claim 13, wherein the outer surface of the central portion and the outermost surfaces of the forward portion and the aft portion are spaced apart from an inner surface of the turbine case to provide a gap between the turbine case and the carrier that extends from a forward end of the forward portion to an aft end of the aft portion.

16. The turbine module of claim 15, wherein the forward hanger is formed to include a cooling-air passage so that high-pressure cooling fluid is conducted into the gap to bias the carrier radially inward relative to the central reference axis.

17. The turbine module of claim 16, wherein the central portion of the carrier is formed to include a cooling-air passage so that the high pressure cooling fluid is conducted radially inward toward the blade track segment.

18. The turbine module of claim 11, wherein the support flange of the carrier is a forward support flange and the carrier further includes an aft support flange spaced apart axially from the forward support flange and an intermediate support flange positioned axially between the forward support flange and the aft support flange.

19. The turbine module of claim 18, wherein the forward portion extends axially forward from the central portion past the forward support flange and the aft portion extends axially aft from the central portion past the aft support flange.

20. The turbine module of claim 19, wherein the turbine case includes a forward case section and an aft case section, the forward case section having a forward attachment flange and a forward hanger engaged with the forward portion of the carrier and the aft section having an aft attachment flange and an aft hanger engaged with the aft portion of the carrier segment.

* * * * *